United States Patent [19]
Lumb et al.

[11] Patent Number: 5,204,156
[45] Date of Patent: Apr. 20, 1993

[54] WINDPROOF AND WATER RESISTANT COMPOSITE FABRIC WITH BARRIER LAYER

[75] Inventors: Douglas Lumb, Methuen; Moshe Rock, Andover, both of Mass.

[73] Assignee: Malden Mills Industries, Inc., Lawrence, Mass.

[21] Appl. No.: 788,913

[22] Filed: Nov. 7, 1991

Related U.S. Application Data

[63] Continuation-in-part of Ser. No. 468,027, Jan. 22, 1990, Pat. No. 5,126,182, which is a continuation-in-part of Ser. No. 422,850, Oct. 17, 1989.

[51] Int. Cl.$^5$ .......................... B32B 5/04; B32B 5/18
[52] U.S. Cl. .................................. 428/96; 156/235; 156/238; 428/246; 428/248; 428/252; 428/253; 428/309.9; 428/315.9
[58] Field of Search .................. 156/235, 238; 428/96, 428/246, 248, 252, 253, 309.9, 315.9

[56] References Cited

U.S. PATENT DOCUMENTS

| | | | |
|---|---|---|---|
| 958,879 | 5/1910 | Krokert | 427/200 |
| 2,384,951 | 9/1945 | Millar | 427/200 |
| 2,404,207 | 7/1946 | Ball | 156/279 |
| 2,430,534 | 11/1947 | Rodli | 156/279 |
| 3,436,245 | 4/1969 | Grundman | 427/200 |
| 3,496,042 | 2/1970 | Wyness | 428/236 |
| 3,518,154 | 6/1970 | Broadhurst | 427/200 |
| 3,575,789 | 4/1971 | Siefert et al. | 427/200 |
| 3,591,401 | 7/1971 | Snyder et al. | 428/88 |
| 3,642,563 | 2/1972 | Davis et al. | 428/220 |
| 3,953,566 | 4/1976 | Gore | 264/288 |
| 3,956,530 | 5/1976 | McKee, Jr. et al. | 427/197 |
| 4,018,956 | 4/1977 | Casey | 427/200 |
| 4,035,532 | 7/1977 | Gregorian et al. | 428/90 |
| 4,056,646 | 11/1977 | Westfall et al. | 428/90 |
| 4,194,041 | 3/1980 | Gore et al. | 428/315 |
| 4,344,999 | 8/1982 | Gohlke | 428/212 |
| 4,352,837 | 10/1982 | Kopenhaver | 427/197 |
| 4,421,809 | 12/1983 | Bish et al. | 428/90 |
| 4,433,026 | 2/1984 | Molde | 428/315.9 |
| 4,443,511 | 4/1984 | Worden et al. | 428/198 |
| 4,459,461 | 7/1984 | Spencer | 219/212 |
| 4,539,255 | 9/1985 | Sato et al. | 428/252 |
| 4,560,611 | 12/1985 | Naka et al. | 428/315.9 |
| 4,613,544 | 9/1986 | Burleigh | 428/315.5 |
| 4,713,068 | 12/1987 | Wang et al. | 428/298 |
| 4,761,324 | 8/1988 | Rautenberg et al. | 428/198 |
| 4,808,458 | 2/1989 | Watt et al. | 428/90 |
| 4,809,447 | 3/1989 | Pacanowsky et al. | 428/253 |
| 4,828,556 | 5/1989 | Braun et al. | 428/913 |
| 4,847,142 | 7/1989 | Twilley et al. | 428/315.9 |
| 4,868,928 | 9/1989 | Norvell | 428/246 |
| 4,935,287 | 6/1990 | Johnson et al. | 428/253 |
| 4,954,388 | 9/1990 | Mallouk et al. | 428/315.9 |
| 4,961,985 | 10/1990 | Henn et al. | 428/315.9 |
| 4,970,109 | 11/1990 | Bryant et al. | 428/253 |
| 5,126,182 | 6/1992 | Lumb et al. | 428/90 |

FOREIGN PATENT DOCUMENTS

| | | | |
|---|---|---|---|
| 2737756 | 1/1979 | Fed. Rep. of Germany | 428/315.9 |
| 1477810 | 4/1965 | France . | |
| 39561 | 2/1986 | Japan . | |
| 1260462 | 1/1972 | United Kingdom . | |
| 1321643 | 6/1973 | United Kingdom . | |

*Primary Examiner*—James C. Cannon
*Attorney, Agent, or Firm*—Blum Kaplan

[57] ABSTRACT

A stretchable, drapable, windproof, water resistant and water vapor permeable composite fabric including an inner layer of fabric, a polyurethane barrier and an outer layer of fabric. The barrier is constructed to allow water vapor molecules to travel therethrough, but restricts the passage of wind and liquid water. The water vapor is transported to and travels through the barrier to the outer fabric layer where it is removed to the environment.

39 Claims, 2 Drawing Sheets

WINDPROOF AND WATER RESISTANT COMPOSITE FABRIC WITH BARRIER LAYER

CROSS-REFERENCE TO RELATED APPLICATIONS

This application is a continuation-in-part of U.S. patent application Ser. No. 07/468,027, filed on Jan. 22, 1990 and entitled DRAPABLE, WATER VAPOR PERMEABLE, WIND AND WATER RESISTANT COMPOSITE FABRIC AND METHOD OF MAKING SAME, now U.S. Pat. No. 5,126,182, which itself is a continuation-in-part of U.S. patent application Ser. No. 07/422,850 filed on Oct. 17, 1989 is now pending and entitled PRINTED FLOCKED FABRIC.

BACKGROUND OF THE INVENTION

This invention relates generally to a clothing material and, in particular to a drapable, stretchable, windproof and water resistant, water vapor permeable, composite fabric that can be used as outerwear.

Treatments to render fabrics wind and water resistant have been known for many years. However, it has been difficult to create fabrics which are suitable for apparel use and which are windproof, water resistant and water vapor permeable. It has also been difficult to create fabrics that are both water vapor permeable and wind resistant. In particular, it has been difficult to create a soft, stretchable, drapable, breathable, wind and water resistant fabric.

Conventional double-faced raised knit fabrics are porous and thus are not effective in sheltering the wearer from wind. In the past, a rubber layer has been adhered to a fabric substrate to impart wind and waterproof qualities and the exposed surface of the rubber layer was flocked. Foamed adhesives have been used to adhere layers of flock in upholstery fabrics. These fabrics, however, have generally been formed using an open weave fabric, such as Osnaburg, as a fabric substrate and do not have the degree of stretchability and drapability required for apparel fabrics.

U.S. Pat. Nos. 4,308,303 to Mastroianni and 4,353,945 to Sampson teach flocked, foam coated, fibrous reinforced, water vapor permeable bacterial barriers for forming surgical drapes and gowns and similar articles. The barriers include a microporous polyolefin film coated with a foam latex polymer upon which a layer of fibers is flocked. The barriers, however, are not suitable for apparel use since the flock is adhered to a polyolefin film, not a fabric. Such materials are also not fully suitable for most outerwear applications.

Previously, a drapable, windproof, water resistant and water vapor permeable composite fabric has been formed by dispersing a thin layer of foamed adhesive between a fabric substrate and a layer of flocked fibers. The pores of the foamed adhesive are formed to be large enough to allow water vapor molecules to pass through, but are too small to allow air or liquid water molecules to pass through, except under pressure. This construction can render the fabric wind and water resistant, but it is neither sufficiently stretchable or drapable for apparel use. In addition, as the wind and water resistance is improved, the water vapor permeability decreases. Thus, it has proved not possible to achieve the desired level of water vapor permeability using this fabric construction technique. Further, for some applications, a flocked outer surface is not satisfactory.

Accordingly, it is desirable to provide an improved windproof, water resistant and water vapor permeable fabric which eliminates the problems associated with prior art fabrics and to provide a novel, soft, stretchable, drapable water vapor permeable, windproof and water resistant composite fabric.

SUMMARY OF THE INVENTION

Generally speaking, in accordance with the invention, a drapable, stretchable, windproof, water resistant, water vapor permeable composite fabric is provided. The composite fabric includes an inner fabric layer, a barrier layer such as a hydrophilic polyurethane barrier thereon and an outer fabric layer suitable for exterior use. The barrier is constructed to prevent air and water droplets from passing through the fabric layers while allowing water vapor to travel therethrough. This renders the fabric windproof, yet breathable and water resistant.

The inner fabric layer may be rendered hydrophilic to provide moisture transport by wicking moisture away from the body. The inner fabric has a knit construction and may have a raised surface facing the body and a plain surface facing the barrier. The plain surface is attached to the barrier.

The barrier layer may be non-porous and hydrophilic or micro-porous and hydrophobic or any combination thereof. If the barrier is non-porous and hydrophilic, moisture vapor next to the body is transported to and travels through the barrier by an absorption-diffusion-desorption process to the outer fabric layer where it is removed to the environment. If the barrier layer is micro-porous and hydrophobic, moisture vapor next to the body is transported to and travels through the barrier's micro-pores to the outer fabric layer where it is removed to the environment.

The outer fabric should be suitable for apparel use. It, like the inner layer, has a knit construction and may be rendered hydrophilic.

The composite fabric according to the invention can be manufactured by forming the barrier on a carrier and then transferring the barrier from the carrier to either or both of the fabric layers and adhering the two fabric layers together.

Accordingly, it is an object of the invention to provide a windproof fabric which is water resistant.

A further object of the invention is to provide a composite fabric which is insulative against wind chill.

A still further object of the invention is to provide a fabric which is water resistant.

Another object of the invention is to provide a water resistant composite fabric having stretchability and drapability suitable for apparel.

Yet another object of the invention is to provide a fabric which is liquid water resistant and water vapor permeable.

Still another object of the invention is to provide an improved composite fabric which is windproof.

Still another object of the invention is to provide improved outerwear material.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
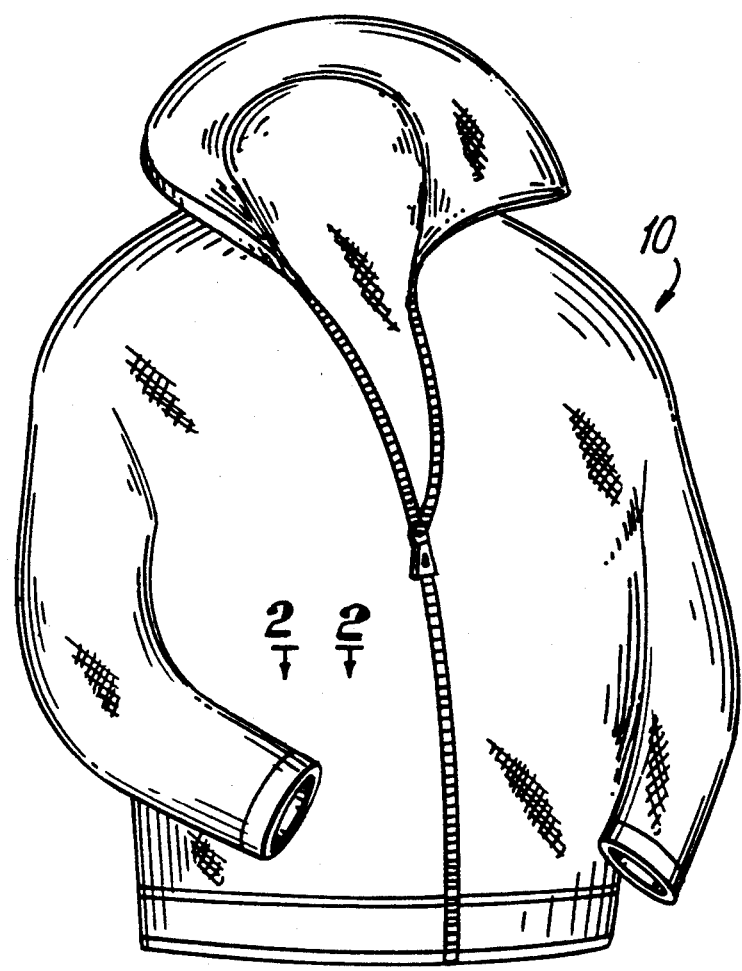
FIG. 1 is a perspective view of a garment made from a composite fabric constructed in accordance with the invention.

Composite fabric material constructed in accordance with the invention is formed with a first layer of outer fabric material, a windproof and water resistant barrier thereon and a second layer of inner fabric material applied to the barrier. The barrier is preferably formed of water resistant material such as polyurethane and should be made to be breathable and to act as an air barrier. The breathability can be imparted by forming the layer to have sufficient thinness to permit water vapor to pass through the layer, as by an absorption-diffusion-desorption process or by providing the material with micro-pores for the passage of said water vapor.

The inner fabric layer may be formed of 100% polyester having a plain surface and a raised surface, such as a brushed polyester fabric or polyester fleece material. The 100% polyester inner fabric layer may be rendered hydrophilic to promote moisture transport, so that the inner fabric will transport moisture from the body to the plain surface.

The barrier is disposed on the inner fabric. When the inner fabric is constructed with a plain surface having raised portions extending therefrom, the barrier is preferably disposed on the plain surface. A particularly well suited barrier is formed from a hydrophilic polyurethane and may be derived from a solvent based system. The hydrophilic polyurethane is formed so that moisture will pass therethrough by an absorption-diffusion-desorption process. Such a polyurethane barrier is non-porous and formed so that body moisture will be transported therethrough, while being sufficiently resistant to the passage of water droplets. The thickness of the barrier or polyurethane layer can be selected to balance breathability and degree of water resistance. In addition, the barrier could be partially hydrophobic, in that there are fewer pores/mm$^2$ than in a true hydrophobic barrier. Therefore, the moisture will pass through the hydrophilic portion of the barrier by an absorption-diffusion-desorption process and through the micro-pores of the hydrophobic portion.

The barrier layer may be an aromatic or an aliphatic polyurethane and can contain: a polyfunctional isocyanate to promote cross-linking, melamine to promote adhesion, aliphatic polyamine to catalyze curing and a fluorocarbon resin for water repellency. A microporous film, permeable to water vapor but impervious to liquid water can also be used. Such a film would be hydrophobic. The barrier layer should be formed to be soft and to have the ability to stretch and recover. It should also preferably be formed to have the ability to adhere to fabric layers without the application of an intervening adhesive. A preferred polyurethane material is available from UCB Chemical Corp., located in Drogenbos, Belgium.

The outer fabric is disposed on the remaining side of the barrier. The outer fabric will be hydrophobic or rendered hydrophilic. The outer fabric can be formed of 100% polyester, such as polyester fleece having terry loop construction, and can have a plain surface with a raised fabric surface extending therefrom. The outer fabric can also be a stretch material. The outer fabric can also be made from acrylic, cotton, nylon, wool, rayon or a combination thereof.

In another embodiment of the invention, a sub-barrier layer is disposed on the desired surface of both the inner fabric and the outer fabric. The two sub-barrier layers are disposed on and adhered to each other, to form the desired barrier layer. In such a case, the sub-barrier layers are preferably joined by heat and/or pressure. The barrier layer or sub-barrier layers can also be adhered with adhesive.

Figure 2:
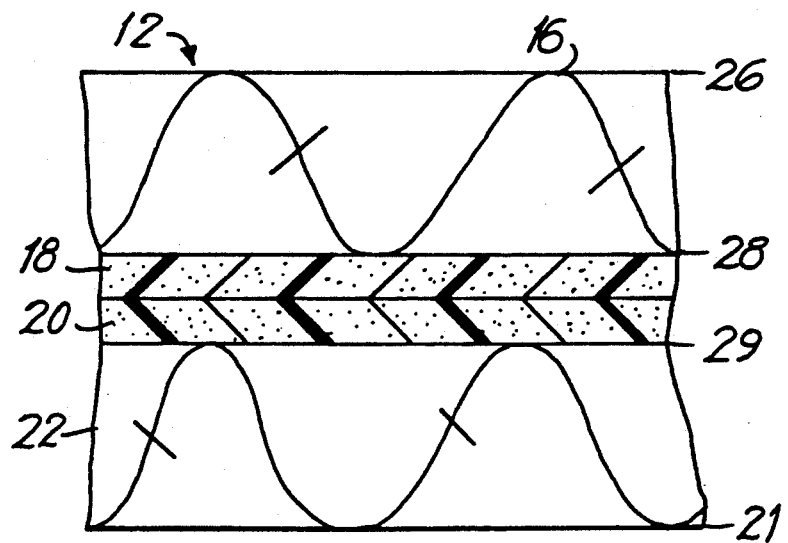
FIG. 2 is an enlarged partial cross-sectional view taken along line 2—2 of the garment FIG. 1.

Reference is made to FIGS. 1 and 2 wherein a garment, indicated generally at 10 is depicted. Garment 10 (i.e. a jacket) is made from a composite fabric in accordance with an embodiment of the invention, indicated generally at 12. Composite fabric 12 includes an inner fabric layer 16, a first sub-barrier layer 18 thereon, a second sub-barrier layer 20 thereon and an outer fabric layer 22 on second barrier layer 20. Inner fabric layer 16 includes a raised surface 26 and a plain surface 28. Sub-barriers 18 and 20 are made of polyurethane and are windproof and water resistant. Outer fabric layer 22 includes a plain surface 29 and a raised surface 21.

In one method of constructing the fabric, sub-barrier layers 18 and 20 are laid on a carrier such as paper (not shown). Sub-barrier layer 18 is transferred from its carrier to inner fabric layer 16 and second sub-barrier layer 20 is transferred from its carrier to outer fabric layer 22. This method, referred to as transfer coating is advantageous because it allows for the precise control of barrier weight and thickness and allows the use of thinner and lighter barrier layers. Sub-barrier layers 18 and 20 are then adhered to each other to form composite fabric 12.

Inner fabric layer 16 can also be made from acrylic, cotton, nylon, polyester, wool, rayon or a combination thereof. It can be treated to provide moisture transport to wick the moisture from the wearer and raised surface 26 facing the wearer to plain surface 28. Then, by a process of absorption-diffusion-desorption, moisture is transferred through sub-barrier layers 18 and 20 to outer fabric layer 22.

In one embodiment, outer fabric layer 22 is a circular weft knit polyester terry loop fabric. The loop and stitch yarn may be filament or spun. If the loop yarn is filament, it is from about 70 to about 150 denier, preferably about 100 denier. If the stitch yarn is filament, it is between from about 70 to about 200 denier, preferably about 100 denier. The fabric layer is from about 0.030 to about 0.30 inches thick, preferably about 0.070 inches thick. However, this fabric layer is described by way of example and not by way of limitation. Outer fabric layer 22 can be a stretch material, nylon shell material and many other types of fabrics. Outer fabric layer 22 may be dyed conventionally with, for example, disperse dyes and it can be treated to be water repellant.

Figure 3:
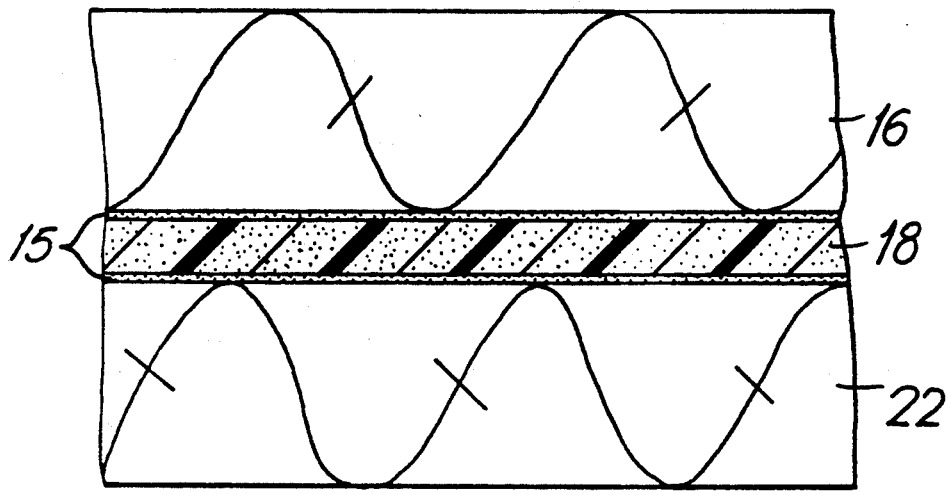
FIG. 3 is a cross-sectional view of a composite fabric constructed in accordance with another embodiment of the invention.

Referring to FIG. 3, in another embodiment of the invention, adhesive is applied to the unraised (plain) side of fabric layers 22 and 16 by gravure printing or by another suitable application process to further secure barrier layer 18 to inner fabric layer 16 and outer fabric layer 22. The adhesive must be discontinuous so as not to interfere with the moisture vapor transport properties of the fabric. Adhesive 15 can be a foamed or unfoamed adhesive, and may be water resistant. Generally, the adhesive is preferably a solvent based polyurethane, such as Ucecoat TD9607, manufactured by UCB Chemical Corp.

Figure 4:
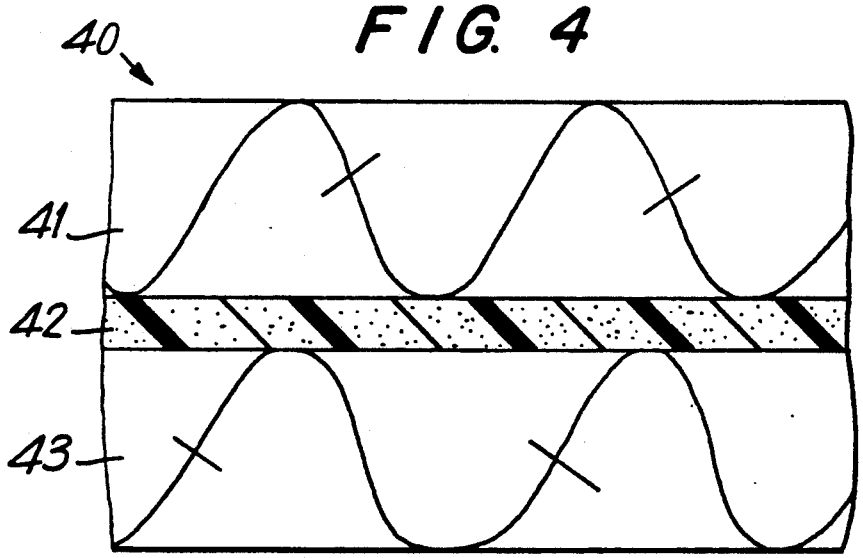
FIG. 4 is a cross-sectional view of a composite fabric constructed in accordance with another embodiment of the invention.

A composite fabric 40 constructed in accordance with another embodiment of the invention is shown in FIG. 4. Fabric 40 is formed with a first fabric layer 41 disposed on barrier layer 42 which is disposed on a second fabric layer 43. Barrier layer 42 should be formed to permit moisture to pass through by an absorption-diffusion-desorption process or by passage through micro-pores. The materials for forming fabric 40 can be the same as those described above, except that fabric 40 includes a single barrier layer.

When composite fabric 12 is used for outerwear, it can provide a breathable fabric which enables water vapor from the wearer to pass through the fabric which therefore will not trap body moisture. However, it will substantially prevent rain water droplets from reaching the wearer. The result is great comfort. The composite fabric of the invention can provide water resistance so that the garment can be used in rainy weather or in snow. Fabric in accordance with the invention can maximize this characteristic without undue sacrifice of the breathability or wind resistance of the garment.

While breathable, composite fabric 12 is impervious to moving air. Therefore, whether the wearer is exposed to windy conditions or creates a windy condition by moving rapidly through still air, the wearer is insulated from the effects of wind chill.

The resultant composite fabric has good drapability, feel and appearance characteristics making it particularly suited for garments. It is also durable, stretchable and comfortable.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended; to cover all of the generic and specific features of the invention herein described and all statements of the scope of the invention which, as a matter of language, might be said to fall therebetween.

What is claimed is:

1. A stretchable, drapable, water vapor permeable, windproof and water resistant composite fabric for use in a garment comprising:
   an outer layer of fabric;
   an inner layer of fabric;
   barrier means for providing resistance to wind and liquid water while providing for water vapor transport through absorption-diffusion-desorption including a hydrophilic barrier layer disposed on and adhered to at least one of said inner or outer layers of fabric by transfer coating from a carrier without a separate adhesive; and
   said other of said inner or outer layers of fabric being disposed on and adhered to said barrier layer.

2. The composite fabric of claim 1, wherein said outer layer of fabric is polyester.

3. The composite fabric of claim 1, wherein said barrier means includes a second hydrophilic barrier layer disposed on and adhered to said other of said inner and outer layers of fabric by transfer coating from a carrier without a separate adhesive, said first-mentioned and said second barrier layers being adhered to each other.

4. The composite fabric of claim 3, wherein said first-mentioned and second barrier layers are adhered to each other with the use of additional adhesives.

5. The composite fabric of claim 1, wherein said inner layer of fabric is hydrophilic.

6. The composite fabric of claim 1, wherein at least one of said outer layer of fabric and said inner layer of fabric is a raised surface knit fabric.

7. The composite fabric of claim 1, wherein at least one of said outer layer of fabric and said inner layer of fabric is a circular weft knit fabric.

8. The composite fabric of claim 1, wherein said outer layer of fabric is hydrophobic.

9. The composite fabric of claim 1, wherein said barrier layer is essentially non-porous.

10. The composite fabric of claim 1, wherein said barrier layer is an essentially non-porous hydrophilic polyurethane barrier layer.

11. The composite fabric of claim 1, wherein said inner layer of fabric is hydrophobic.

12. The composite fabric of claim 8, wherein said inner layer of fabric is hydrophobic.

13. The composite fabric of claim 1, further including a discontinuous adhesive layer interposed between the other of said inner and outer layers of fabric and said barrier layer.

14. The composite fabric of claim 1, wherein at least one of said outer layer of fabric and said inner layer of fabric is selected from the group consisting of polyester, acrylic, cotton, nylon, wool, rayon or a combination thereof.

15. The composite fabric of claim 1, wherein said outer layer of fabric and said inner layer of fabric are both a stretchable material.

16. The composite fabric of claim 1, wherein said outer layer of fabric and said inner layer of fabric are both raised surface knit fabrics.

17. A stretchable, drapable, water vapor permeable, windproof and water resistant composite fabric for use in a garment comprising:
   an outer layer of fabric;
   an inner layer of fabric; and
   barrier means for providing resistance to wind and water while providing for water vapor transport, including a microporous hydrophobic polyurethane barrier layer disposed on and adhered to one of said inner or outer layers of fabric by transfer coating from a carrier without a separate adhesive; said other of said inner or outer layers of fabric being disposed on and adhered to said barrier layer.

18. The composite fabric of claim 17, wherein said outer layer of fabric is polyester.

19. The composite fabric of claim 17, wherein said barrier means includes a second hydrophobic barrier layer disposed on and adhered to said other of said inner and outer layers of fabric by transfer coating from a carrier without a separate adhesive, said first-mentioned and said second barrier layers being adhered to each other.

20. The composite fabric of claim 19, wherein said first-mentioned and second barrier layers are adhered to each other with the use of additional adhesives.

21. The composite fabric of claim 17, wherein at least one of said outer layer of fabric and said inner layer of fabric is a raised surface knit fabric.

22. The composite fabric of claim 17, wherein at least one of said outer layer of fabric and said inner layer of fabric is a circular weft knit fabric.

23. The composite fabric of claim 17, wherein said outer layer of fabric is hydrophobic.

24. The composite fabric of claim 17, wherein said inner layer of fabric is hydrophobic.

25. The composite fabric of claim 24, wherein said outer layer of fabric is rendered hydrophobic.

26. The composite fabric of claim 17, further including a discontinuous adhesive layer interposed between the other of said inner and outer layers of fabric and said barrier layer.

27. The composite fabric of claim 1, wherein said barrier layer also includes hydrophobic material.

28. The composite fabric of claim 17, wherein said barrier layer also includes hydrophilic material.

29. The composite fabric of claim 16, wherein said inner layer of fabric is hydrophilic.

30. A method of forming a stretchable, drapable, water vapor permeable, windproof and water resistant composite fabric, comprising the steps of;
   adhering a barrier layer on one side of one of an outer or inner layer of fabric by transfer coating without using an additional adhesive, said barrier layer being selected from the group consisting of a hydrophilic material, a hydrophobic polyurethane material and a combination thereof; and
   adhering the other of the inner and outer layers of fabric to said barrier layer to form said composite fabric.

31. The method of claim 30, further including the step of adhering a further barrier layer on one side of the other of said inner and outer layers of fabric, said other layer of fabric being adhered to said first-mentioned barrier layer with said further barrier layer in engagement with said first-mentioned barrier layer.

32. The method of claim 30, further including the step of applying a discontinuous layer of adhesive between the other of said inner or outer fabric layers and said barrier layer.

33. The method of claim 30, further including applying a water resistant coating to said composite fabric.

34. The method of claim 30, wherein at least one of said outer layer of fabric and said inner layer of fabric is selected from the group consisting of polyester, acrylic, cotton, nylon, wool, rayon or a combination thereof.

35. The method of claim 30, wherein said outer layer of fabric and said inner layer of fabric are both a stretchable material.

36. The method of claim 30, wherein said inner layer of fabric is hydrophobic.

37. The method of claim 30, wherein said inner layer of fabric is hydrophilic.

38. The method of claim 30, wherein said outer layer of fabric is hydrophobic.

39. The method of claim 36, wherein said outer layer of fabric is hydrophilic.

* * * * *

UNITED STATES PATENT AND TRADEMARK OFFICE
CERTIFICATE OF CORRECTION

PATENT NO. : 5,204,156
DATED : April 20, 1993
INVENTOR(S) : Lumb et al.

It is certified that error appears in the above-identified patent and that said Letters Patent is hereby corrected as shown below:

Title page,
Item [75], Inventors, please add -- Mark Shanley --

Signed and Sealed this

Thirtieth Day of November, 2004

JON W. DUDAS
*Director of the United States Patent and Trademark Office*